United States Patent [19]

Arlowe

[11] Patent Number: 4,553,026

[45] Date of Patent: Nov. 12, 1985

[54] CAPACITIVE LABEL READER

[75] Inventor: H. Duane Arlowe, Albuquerque, N. Mex.

[73] Assignee: The United States of America as represented by the United States Department of Energy, Washington, D.C.

[21] Appl. No.: 514,126

[22] Filed: Jul. 15, 1983

[51] Int. Cl.$^4$ .............................................. G06K 7/08
[52] U.S. Cl. .................................... 235/451; 235/462; 235/492; 235/494
[58] Field of Search ................ 235/451, 462, 492, 494

[56] References Cited

U.S. PATENT DOCUMENTS 2,964,734 12/1960 West .................................... 235/451

Primary Examiner—Harold I. Pitts
Attorney, Agent, or Firm—George H. Libman; Albert Sopp; Judson R. Hightower

[57] ABSTRACT

A capacitive label reader includes an outer ring transmitting portion, an inner ring transmitting portion, and a plurality of insulated receiving portions. A label is the mirror-image of the reader except that identifying portions corresponding to the receiving portions are insulated from only one of two coupling elements. Positive and negative pulses applied, respectively, to the two transmitting rings biased a CMOS shift register positively to either a 1 or 0 condition. The output of the CMOS may be read as an indication of the label.

9 Claims, 5 Drawing Figures

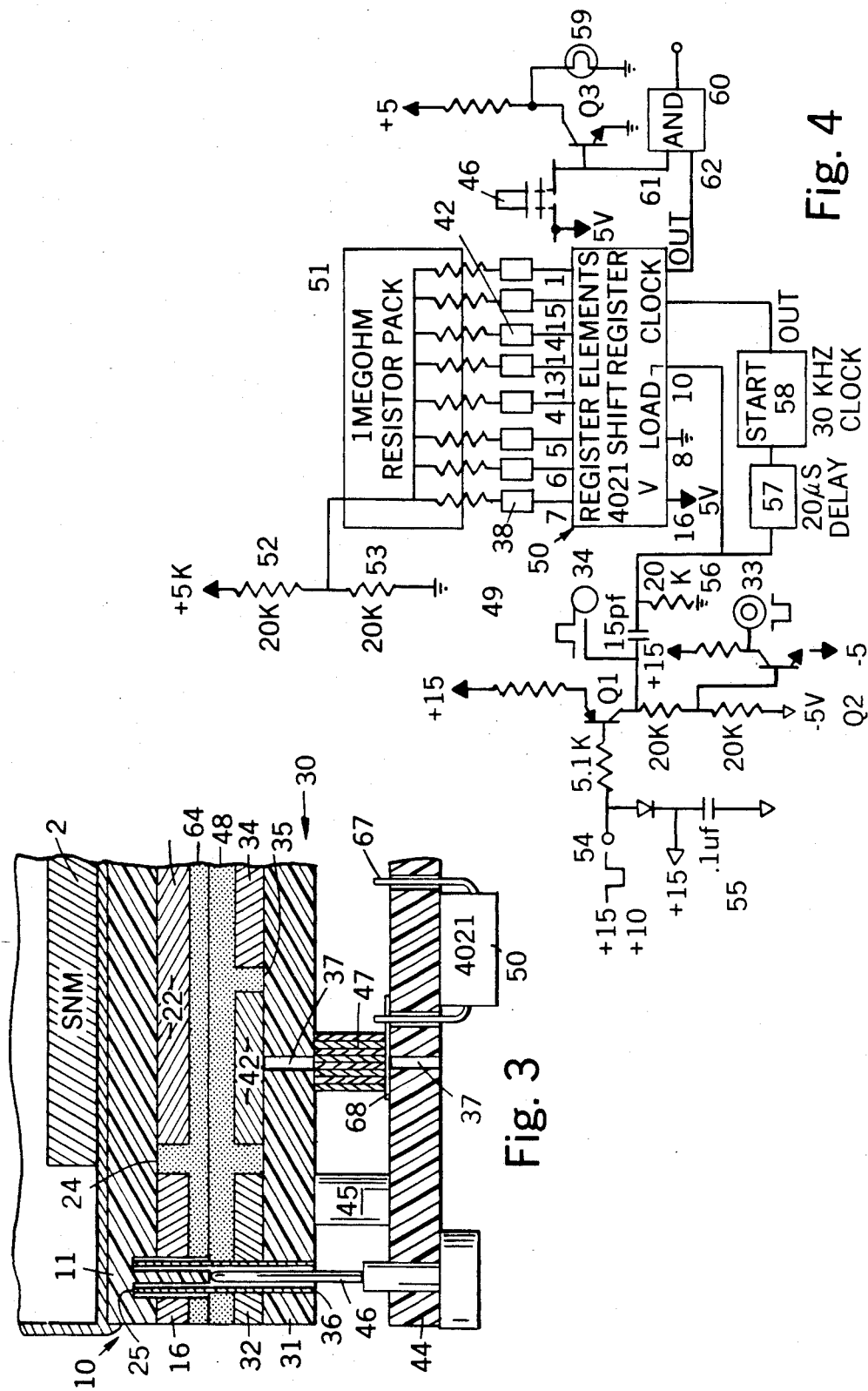

CAPACITIVE LABEL READER

The United States Government has rights in this invention Pursuant to Contract No. DE-AC04-76DP00789 between the Department of Energy and Sandia Corporation.

BACKGROUND OF THE INVENTION

The present invention relates generally to a label identification system and more particularly to a capacitive label identification system for use in remote locations.

The storage of Special Nuclear Material (SNM) such as uranium or plutonium has special problems not usually associated with the storage of large quantities of precious metal. For instance, because of the potential for contamination, SNM must be sealed in air-tight containers that are reasonably small to avoid the problem of critical mass. One common container that has been found useful for this purpose is the 46 ounce foodpack can, a container more often used for retail distribution of tomato juice. For SNM, these containers carry an identification label and a frangible plastic or paper seal. The containers are kept in a vault for physical security, and must be periodically inventoried to maintain accountability of the SNM. A random sample of containers are opened for an actual material verification. Since these cans do not provide shielding for the radiation of the material contained therein, the accountability procedure absorbs much of the allowable safe-exposure limit for the custodial personnel; and, because of the long interval between inventories, does not provide the real-time accountability needed to help deter theft.

A previous system considered for use at one Department of Energy SNM storage facility utilizes limit switches to provide electrical signal indications that a can is at a location and that the can is not bulging (an indication that impurities in the SNM may cause the can to rupture). However, no current system permits a remote monitoring of the identity of a particular can at a particular location.

SUMMARY OF THE INVENTION

It is the object of this invention to provide an identifying label for a container and a capacitive label reader for mounting near the storage location of the container.

It is another object of this invention to provide a capacitive monitoring system using two transmitted signals for reliability.

Additional objects, advantages and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the monitoring system of this invention may comprise a capacitive label reader for mounting near a storage location including an insulated board having a conductive surface including two spaced transmitting portions and a plurality of receiving portions extending there between, pulse means for simultaneously transmitting first and second distinct electrical pulses, respectively, from the first and second transmitting portions, and receiving circuitry connected to the receiving portions for identifying the characteristics of pulses received by these portions. The invention further includes a capacitive identifying label for mounting on a container, the label having an insulated board including a substantially mirror-image of the reader board, with first and second coupling portions corresponding to the first and second transmitting portions, and a plurality of identifying portions corresponding to the receiving portions. Each identifying portion is electrically connected to only one coupling portion to define a unique code for the label.

BRIEF DESCRIPTION OF THE DRAWINGS

The accompanying drawings, which are incorporated in and form a part of the Specification, illustrate an embodiment of the present invention and, together with the description, serve to explain the principles of the invention.

FIG. 3 shows a partial cut-away view of the reader in contact with a label.

FIG. 4 shows the control circuitry of the invention.

DETAILED DESCRIPTION OF THE INVENTION

Figure 1:
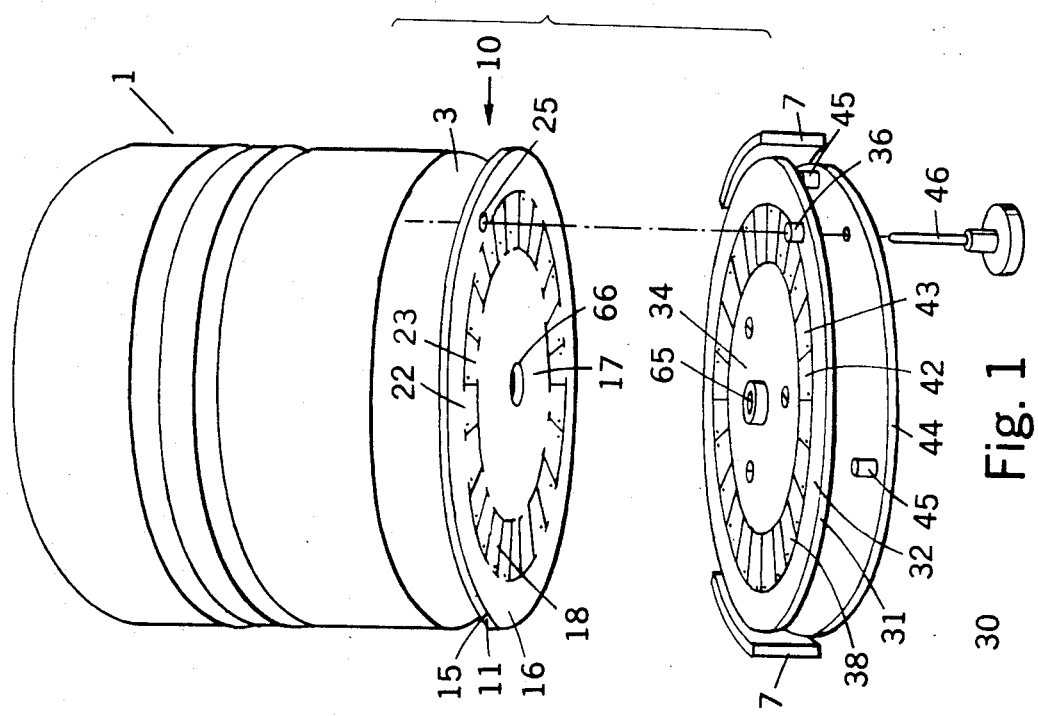
FIG. 1 is an exploded view of the invention.

FIG. 1 shows an exploded view of the invention in an intended environment including a typical container 1 (a 46 ounce foodpack can) for Special Nuclear Material having a label 10 including an insulated board 11 sized for attachment to bottom 3 and an electrically conductive coating 15 on the side of board 11 away from container 1. As described in more detail hereinafter, coating 15 of label 10 includes a first coupling portion 16, a second coupling portion 17 spaced from and electrically insulated from first portion 16, and a plurality of identifying portions 18-23 extending between the coupling portions. Each identifying portion is electrically insulated from adjacent identifying portions and from one of the coupling portions 15, 16. As described hereinafter, the pattern of connections to the coupling portions defines the unique code of label 10. Label 10 further includes an indexing annulus 25 extending into the surface including coating 15.

The invention also includes capacitive label reader 30 for mounting near a storage location such as shelf 5. Guides 7 are provided to insure placement of can 1 atop reader 30, and pin 65 insures accurate centering of the label. Switch ferrule 36 in an upper surface of reader 30 insures proper rotational alignment of label 10 with respect to reader 30.

The upper surface of reader 30 is another insulated board 31 having an electrically conductive coating 33 which forms essentially a mirror-image of the pattern of label 10. (See also FIGS. 2A and 2B). For example, a first transmitting portion 32 corresponds in size and shape to first coupling portion 16 of label 10. A second transmitting portion 34 corresponds in size and shape to second coupling portion 17. Finally, a plurality of receiving elements 38-42 correspond in size and shape to identifying elements 18-22. The significant difference between the pattern of label 10 and the pattern of reader 30 is that every portion of reader 30 is electrically insulated from each adjacent portion, while each identifying portion of label 10 is connected to one of the adjacent coupling portions.

While the specific embodiment of reader and label disclosed is shaped and sized to fit a 46 ounce foodpack can 1, it is contemplated that the label and reader may take any size and any shape, and may be located on any surface of container 1, as long as the principles disclosed and claimed herein are followed.

Figure 2A:
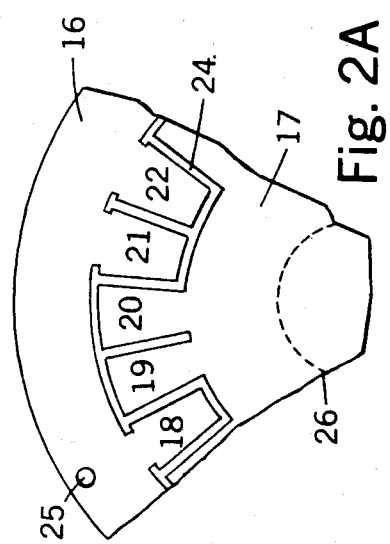
FIGS. 2A and 2B show sections of the label and reader boards, respectively.
Figure 2B:
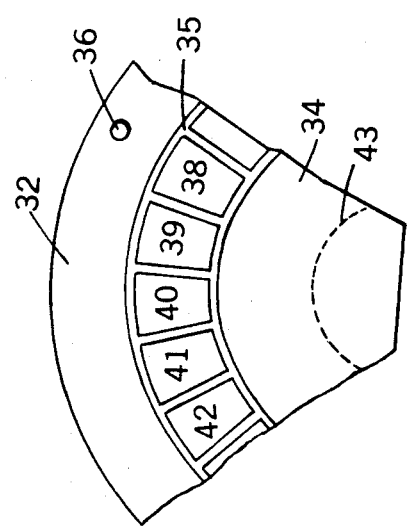

In order to get a better idea of the construction and operation of the invention, reference should now also be made to FIGS. 2A and 2B, which show the pattern of the label and reader, respectively, and FIG. 3, which shows label 10 and reader 30 in operational contact with each other.

FIG. 2B shows first transmitting portion 32 of label 30 to be an outer ring and second transmitting portion 34 to be either an inner disk or, if cut-off at dashline 43, an inner ring. A plurality of receiving portions 38-42 are insulated from each other and from each transmitting ring by a gap 35 in the metallic coating and are evenly spaced between the transmitting rings. FIG. 2A shows the equivalent portion of label 10 to have first coupling outer ring 16, second coupling inner ring or disk 17 (depending upon the presence or absence of coating material inside the circle defined by dashline 26), and a plurality of identifying elements 18-22. Although each identifying element is electrically insulated by gap 24 in coating 15 from adjacent identifying elements, each element is only insulated from one of coupling rings 16 or 17. As shown, identifying elements 18, 21 and 22 are electrically connected to outer coupling element 16 while identifying elements 19 and 20 are electrically connected to inner coupling element 17. This conduction may be formed by either eliminating the gap as shown between element 19 and coupling element 17 or by a bridge 27 over an existing gap as shown between outer ring 16 and element 21.

In operation, when container 1 is properly positioned on a storage location, label 10 will be capacitively coupled to reader 30 such that outer ring 32 couples to outer ring 16, inner ring 34 to inner ring 17 and identifying elements 18-22 to receiving elements 38-42, respectively. Electrical pulses of first and second characteristics are applied to transmitting portions 32 and 34, respectively. These pulses are capacitively coupled to first and second coupling portions 16 and 17, respectively. Depending upon the electrical connections between each element and one of elements 16 and 17, identifying 18-22 are charged with either the pulse of the first characteristic or the pulse of the second characteristic. These charges are capacitively coupled back to receiving elements 38-42 where they may be read as hereinafter described. A significant advantage of this two-pulse system over prior readers which use the presence or absence of a single pulse will be discussed hereinafter.

FIG. 3 shows an operational configuration of the invention wherein label 10 is affixed by an adhesive (not shown) to bottom 3 of container 1 containing special nuclear material 2. Guide pin 65 and centering hole 66 (FIG. 1) insure that outer rings 16, 32 and inner rings 17, 34 are always correctly aligned, and switch actuator 60 ferrule 36 extending from board 31 through ring 32 and into annulus 25 of label 10 insures the correct alignment of identifying element 22 with respect to receiving element 42. The center portion in annulus 25 will cause switch pin 46 to be actuated when label 10 is correctly aligned. This construction prevents defeat of the alarm switch pin 46 by slipping a card between label 10 and reader 30 before moving container 1. To insure that label 10 remains in capacitive and not conductive relationship with reader 30, metallic coating 15 is covered by a thin plastic film 64 and metallic coating 33 is covered by a plastic film 48. In a preferred embodiment, a three mil plastic film was utilized as each film.

FIGS. 1 and 3 also show that label reader 30 may include a second insulating board 44 spaced by spacers 45 from board 31. This construction prevents component leads such as lead 67 from piercing metal coating 32 of reader 30. The electrical components of the control circuit 49 such as shift register 50 may be mounted to the outside of board 44 with leads 67 protruding through mounting holes to the other side as is well known in the art. A typical electrical connection between one such component and a receiving element is illustrated in FIG. 3, where a hole 37 is drilled through receiving element 42 and the inside of the hole is plated with electrically conductive material. To provide connection between the hole 37 and lead 67, a commercial conductor 47 manufactured by Technit Inc. which comprises a plurality of elastic parallel insulators and conductors held within a plastic web is force-fit between hole 37 and land 68. This material permits conduction directly along conductors as shown, but does not permit conduction across different conductors to electrical leads which are not directly aligned with plated holes in board 31. In this manner it is a simple matter to connect lead 67 of an element such as shift register 50 to hole 37. This technique was found to be useful in minimizing lead length, thereby reducing undesirable capacitance effects of long leads.

Some additional advantages of this invention may be seen by reference to the electronic circuitry 49 shown in FIG. 4, which includes a voltage divider comprising resistors 52, 53 for applying 2.5 volts through resister pack 51 to each of receiving elements 38-42. While only five elements are specifically identified on the figures for clarity, it is to be understood that the specific embodiment of FIG. 4 shows eight elements to correspond to the eight register elements of shift register 50, while a specific embodiment for a 46 ounce foodpack can 1 may involve 24 elements and three shift registers.

Input terminal 54 receives a 12 microsecond input pulse that varies from +15 to +10 volts. Stripper circuit 55 removes the AC component and transistors Q1 and Q2 provide positive and negative pulses for inner transmitting ring 34 and outer transmitting ring 32, respectively. As discussed before, these pulses are coupled through coupling rings 16 and 17 to predetermined ones of identifying portions on the label, and then back to receiving portions on the reader. At the output of Q1, differentiation circuit 56 in combination with parasitic circuit effects provides a 1 microsecond delay before a load pulse is applied to shift register 50, thereby causing the voltage on each register element to be parallel loaded into shift register 50. Approximately 20 microseconds later, after the input pulse has ended, delay 57 applies a start signal to clock 58, which serially reads out the signals stored in shift register 50 to one input 62 of and-gate 60. The other input 61 of and-gate 60 is connected through limit switch 46 to an enable signal. Accordingly, if label 10 is properly located on reader 30 such that switch actuator 25 protrudes into reader hole 36 and contacts limit switch 46, then a serial binary signal is provided at the output of and-gate 60 for use in identifying the correct placement of the label on the reader. If the label is misaligned such that limit switch 46 is opened, no identifying signal may be read and transistor Q3 will be off, allowing warning light 59 to light.

Existing credit card-type readers use a single coupling element and a plurality of identifying elements, which are either connected or not connected to the coupling element, thereby providing reading elements with either the presence or absence of a signal. This invention is advantageous over such devices in that each register element of the invention is biased at the transition point, and the coupled pulses either positively turn the element to a one condition or to a zero condition. A weak signal caused by warpage of the label or extraneous material between the label and reader still provides a signal of sufficient strength to positively turn each element of the invention to its correct code. However, a typical prior system which is biased one volt below this threshold will provide an erroneous reading if a signal of less than one volt is received at any element.

The particular components and equipments discussed above are cited merely to illustrate a particular embodiment of the invention. It is contemplated that the use of this invention may involve different components and circuitry as long as the principles disclosed herein are followed. For example, andgate 60 may be situated anywhere within circuitry 49 that prevents the clocking of shift register 50 unless limit switch 46 is actuated. In addition, it is contemplated that the invention may be used in combination with other sensors, and that readings from these sensors and from this invention may be computer-controlled by utilization of conventional techniques. This invention will provide a sensitive, inexpensive and reliable indication of the identification of a label at a storage location. It is intended that the scope of the invention be defined by the claims appended hereto.

I claim:

1. A monitoring system for monitoring the identity of a container at a storage location, said system comprising:
    a capacitive label reader for mounting near a storage location, said reader comprising an insulated board having a conductive surface including a first transmitting portion, a second transmission portion spaced from and electrically insulated from said first portion, a plurality of receiving portions, each of said receiving portions extending between said first and second transmitting portions and each receiving portion being electrically insulated from each adjacent receiving portion and from said transmitting portions; pulse means for simultaneously transmitting a first electrical pulse having a first distinct characteristic to said first transmitting portion and a second electrical pulse having a second distinct characteristic to said second transmitting portion; and receiving means connected to said receiving portions for identifying the characteristics of pulses received by said receiving portions;
    a capacitive identifying label for mounting on a container, said label comprising an insulated board having a conducting surface forming essentially a mirror-image of said reader conductive surface, said label surface including a first coupling portion corresponding in size and shape to the first transmitting portion of said reader, a second coupling portion electrically insulated from said first coupling portion and corresponding in size and shape to said second transmitting portion, and a plurality of identifying portions, each indentifying portion corresponding in size and shape to a receiving portion of said reader, and each portion being electrically insulated from each adjacent portion and from only one of said coupling portions, whereby the pattern of connections between said identifying portions and said coupling portions defines a unique code for the label; whereby when said label is aligned with said reader and said transmitting portion energized, the pulses are coupled to said coupling portions and, depending upon the pattern of connections, each receiving portion receives either a first or second pulse.

2. The monitoring system of claim 1 wherein each of said first transmitting portion and said first coupling portion form an outer ring, and each of said second transmitting portion and said second coupling portion form an inner ring.

3. The monitoring system of claim 2 wherein said inner ring forms the outer portion of a disk.

4. The monitoring system of claim 2 wherein each of said identifying and said receiving portions are substantially identical in size and have a narrow end adjacent to the inner rings, a wide end adjacent to the outer ring, and two sides, each side being adjacent a side of an adjacent portion.

5. The monitoring system of claim 1 wherein said receiving means comprises:
    a CMOS shift register having a plurality of register elements, each register element being connected to only one of said receiving portions;
    means for biasing each register element at its transition point; and
    control circuitry including means for enabling said receiving means only when a label is aligned with said reader.

6. The monitoring system of claim 5 wherein said means for enabling comprises a limit switch actuated by said label.

7. The monitoring system of claim 5 wherein said first electrical pulse is a positive pulse to bias said register elements to a 1 condition, and said second electrical pulse is a negative pulse to bias said register elements to a 0 condition.

8. The monitoring system of claim 5 wherein said control circuitry further comprises means for applying a signal to each of said register elements only during operation of said pulse means.

9. The monitoring system of claim 5 wherein said control system further comprises means for unloading the contents of said register elements after completion of operation of said pulse means.

* * * * *